US007108876B2

(12) United States Patent
Grindstaff et al.

(10) Patent No.: US 7,108,876 B2
(45) Date of Patent: Sep. 19, 2006

(54) SHAPED CHEESE RECONSTRUCTION WITH TRANSGLUTAMINASE

(75) Inventors: Donald Grindstaff, Apple Valley, MN (US); Rulon A. Chappell, North St. Paul, MN (US)

(73) Assignee: Nutricepts, Inc., Burnsville, MN (US)

( * ) Notice: Subject to any disclaimer, the term of this patent is extended or adjusted under 35 U.S.C. 154(b) by 897 days.

(21) Appl. No.: 09/770,031

(22) Filed: Jan. 25, 2001

(65) Prior Publication Data

US 2002/0106423 A1   Aug. 8, 2002

(51) Int. Cl.
*A23C 9/12* (2006.01)

(52) U.S. Cl. .......................... 426/36; 426/42; 426/582
(58) Field of Classification Search ................ 426/34, 426/36, 42, 582, 38, 55, 56, 580
See application file for complete search history.

(56) References Cited

U.S. PATENT DOCUMENTS

| 4,190,100 A | | 2/1980 | Wallace |
| 4,551,338 A | | 11/1985 | Wallace |
| 4,917,904 A | | 4/1990 | Wakameda et al. |
| 5,085,615 A | | 2/1992 | Gundlach et al. |
| 5,156,956 A | | 10/1992 | Motoki et al. |
| 5,518,742 A | | 5/1996 | Soeda et al. |
| 5,681,598 A | * | 10/1997 | Kuraishi et al. .............. 426/36 |
| 5,686,124 A | | 11/1997 | Moller et al. |
| 5,928,690 A | | 7/1999 | Wiebe, Jr. |

FOREIGN PATENT DOCUMENTS

| EP | 0201975 | 11/1986 |
| EP | 0333528 | 9/1989 |
| EP | 0711504 | 10/1995 |
| JP | 2079956 | 3/1990 |
| JP | 2086748 | 3/1990 |
| JP | 2100651 | 4/1990 |
| JP | 2100653 | 4/1990 |
| JP | 2100654 | 4/1990 |
| JP | 2100655 | 4/1990 |
| JP | 2255060 | 10/1990 |
| JP | 3210144 | 9/1991 |
| JP | 5207864 | 8/1993 |
| JP | 6090710 | 4/1994 |
| JP | 6113796 | 4/1994 |
| JP | 6197738 | 7/1994 |
| JP | 6225729 | 8/1994 |
| JP | 6261692 | 9/1994 |
| WO | 9701961 | 1/1997 |

OTHER PUBLICATIONS

Righi et al., A cross-linking approach for studying mutual spatial relationships of protein components in cheese., Milchwissenschaft, 1996, 51(8), 442-446.*

* cited by examiner

*Primary Examiner*—Leslie Wong
(74) *Attorney, Agent, or Firm*—Mark A. Litman & Associates, P.A.

(57) ABSTRACT

A process improves the quality of recombined curd, milled cheese curds and/or cheese components by reducing voids and apparent lines of fracture in the recombined cheese, without the necessity of adding such volumes or types of materials into the product as would affect other aspects of quality such as taste. The process comprises combining segments of curds or cheese with a selected quantity of transglutaminase that coats surfaces of curd or cheese segments to be combined. The curds may be milled cheese curds, and may be taken directly off-line in the manufacturing process 9 with or without cooling), and then combined with the transglutaminase, then fed into a form. The segments with the transglutaminase are stored at a temperature (and pressure) and for a time sufficient to fuse, bond, lessen, repair or reverse the apparent lines and voids between interfaces where the segments are in contact with each other. The process may allow the segments of cheese to react with the transglutaminase for at least 5 minutes in a temperature range of between 32 to 125° F. The transglutaminase has been found to be useful in various forms, including, but not limited to solid and liquid application media. As a solid, the transglutaminase may be provided in any active form (e.g., solid compound, salt, complex, encapsulate, mixture or blend and may be used in a pure or diluted state. Because of the activity level of the transglutaminase, it is preferred to provide the active ingredient in a diluted form. In a solid format, the transglutamines in an active form may be diluted with any biotolerable solid (e.g., non-toxic filler), particularly those with no taste or flavor, or those with desired taste and flavor. Among the types of fillers that would be tolerable or desirable would be salts (e.g., common NaCl), carbonates (e.g., $CaCO_3$, $MgCO_3$, etc.), inorganic oxides (e.g., silica), microcellulose fibers, pulp fiber, etc.

17 Claims, No Drawings

SHAPED CHEESE RECONSTRUCTION WITH TRANSGLUTAMINASE

BACKGROUND OF THE INVENTION

1. Field of the Invention

The present invention relates to the field of cheese manufacturing, more particularly to the field of cheese shaping and packaging, and more particularly to the field of construction shaped cheese units out of partial cheese segments.

2. Background of the Art

The principal solid constituent of milk is casein, a protein. When raw or pasteurized milk is allowed to stand in a warm place, it sours, and the casein is precipitated by the action of lactic acid bacteria. For example, in the case of pasteurized milk, in which these harmless bacteria have been killed, an acid "Starter" must be added. The thick precipitate (e.g., the curd) that results from the action of the lactic acid bacteria (a lacto bacillus) is separated from the thin, watery residue known as whey. This was the earliest method of producing cheese and it is still used to make pot cheese and cottage cheese, although curd prepared with rennet, which acts to speed the separation process, is generally a preferred method of manufacture today. The curd, however prepared, contains (in addition to the protein) most of the other food values of the milk, including butterfat, minerals, sugar, and vitamins. Cheese may be made from the milk of ewes, goats cows, or any other lactating mammal, with the flavor and nutritional content varying among species.

The next steps in the making of cheese include at least salting (for flavor and eventually to aid in curing) and pressing (to shape the cheese and eliminate more whey). The curd is then ready for curing and is stored under temperature-and humidity-controlled conditions for varying lengths of time. Some cheese, such as cream or cottage cheese, is not cured. In general, the longer the curing or aging process, the more pronounced the flavor of the finished product. During curing, gases are formed within the cheese, and in some types they are unable to escape, forming large pores or holes within a block of cheese. This produces the holes, or eyes, characteristic of, for example, Swiss cheese. To aid the curing process in the formation of particular forms of cheese, harmless-to-human spores of mold (e.g., blue-mold spores) are introduced into cheese. The manufacture of the blue-veined cheeses (Roquefort or blue cheese) uses blue mold spores added to the vein structure, and white-mold spores are sprayed on the surface of such cheeses as Brie and Camembert. This surface treatment produces a "bloomy" rind, which may be eaten or not according to personal preference. The rinds of other cheese are washed with whey or brine. Still other varieties of cheese that are sprayed with mold or have mold added to the underlying composition are rindless.

There are more than 2000 varieties of cheese known today, including variations of original types, such as American Swiss cheese. Regardless of their animal sources, all cheese are divided into two basic categories; natural cheese and process cheeses. The latter, a recent development, are blends of several kinds of natural cheeses with the addition of emulsifiers. While they may keep longer than natural cheeses, their nutritive value is the same.

The butterfat content of cheese, that is, the amount of butter fat remaining in the cheese solids after all moisture has been removed, varies according to whether the cheese has been made with whole milk, skim, or part-skim milk, or enriched milk. Skim-milk cheese has a butterfat content of 0.5 percent or less. Average cheeses, such as Cheddar, Gouda, or Camembert, have a fat content of from 45 to 50 percent. Double and triple creme cheeses have 60 to 75 percent butterfat. In addition to typing by fat content, cheese can be categorized by consistency or moisture content. Thus, there are hard-grating cheeses, ripened longer and with sharp flavor (for example, Parmesan), hard cheeses (for example, Cheddar), semisoft cheeses (for example, Roquefort or Limburger), and soft cheeses (for example Camembert or cottage cheese). The latter two categories are the more perishable, but storage times vary for all cheese. In general, cheese for home consumption should be kept under refrigeration at between 1.5° C. to 4.5° C. (35° F. to 40° F.) and securely wrapped to prevent drying out.

In cheese manufacturing, there is significant segmentation, waste, scrap and trim of the cured and processed cheese that can be lost during manufacturing and packaging steps. It is common practice to process the waste or scrap into sellable forms, such as processed cheese or cheese spreads.

In the manufacture of bulk forms of cheese by conventional means, a milled or stirred, salted curd is filled into a bulk form, such as either a 500 pound (227 kilo) "barrel" or a 640 pound (291 kilo) cube. After filling the form, vacuum probes are placed into the barrel or block of loose curd to remove residual whey. The bulk container may be tipped to allow excess whey to be drained away. The bulk containers are then placed in a vacuum chamber to finish the forming and draining of the cheese mass. This probing, tipping and vacuuming process is somewhat cumbersome and can be a point for contamination of the cheese with undesirable microorganisms and or foreign material.

One improvement of this process that is practiced in the industry with increasing prevalence is to convey the milled or stirred salted curd into a forming tower (e.g., a Wincanton tower) commonly used for the final draining and forming of cheese into 40 pound (18.2 kilo) blocks. The cheese exits the tower thoroughly drained and formed into a semi-solid block. The innovation has been to break this semi-solid block into smaller pieces, convey the smaller pieces into the 227 kilo barrels or 291 kilo block, apply vacuum and/or pressure, and sealing the liner or bulk container. The cheese then tends to re-knit into a solid form during a cooling and storage period (estimated 5-days for cooling and from days to weeks to months for cold storage).

Unless conditions of temperature, pH of the curd, rate of cooling of the curd, pressure/vacuum in the container, etc., are ideal, the cheese is formed with "mechanical openings and visible seams where the pieces of curd or cheese have been joined into the larger form of cheese. The cheese can easily fracture along these seams. Where much of the bulk cheese is used, these conditions are of little consequence, since the bulk cheese will be shredded or ground as an ingredients for later processing.

As previously noted, however, in some applications, including procurement by the USDA, there are numerous factors that are built into the valuation and grading of cheese, including United States Standards for Grades of Bulk American Cheese, effective Aug. 2, 1991, Sections 58.2455 through 58.2462.

The compacted product has the same essential cheese compositional quality as the original blocks formed, but may not be graded as high as the original material. This lower grading is the result of an anomaly in the grading procedures that does not rely entirely upon the sensory qualities or nutritional composition of the cheese, but also relies on structural factors that do not impact the taste or nutritional quality of the cheese. In particular, samples of cheese are graded by taking cores or plugs of cheese, and inspecting the cheese core to determine features such as pore content and fracture lines in the cheese. The more numerous the spacing or pores, the more fragile segmentation lines, and the appearance of other physical defects in the construction can dominate the grading, reducing the quality value of a cheese to a much lower grade, even though the actual content quality of the cheese is very high with respect to flavor and nutrition. The specifications for this testing are noted above in the U.S.D.A. Standards for Grades of Bulk American Cheese.

EP 0 711 504 B1 describes a method for increasing the eight of a curd by the addition of a transglutaminase (alone or in combination with a milk clotting enzyme, a rennet) into a solution containing milk or a milk protein. The process is carried out by adding the transglutaminase (with or without the rennet0 to a solution containing the milk or milk protein, heat-treating the solution to deactivate the transglutaminase (and optionally adding the milk clotting enzyme). The process may also be effected by first adding the rennet and allowing the enzyme to act on the milk or milk protein solution, and then adding the transglutaminase. In all cases, the transglutaminase is added prior to forming of the cheese curd or composition.

WO 97/01961 describes a process for making cheese comprising: a) adding to a milkcheese a transglutaminase, incubating for a suitable period, b) incubating with a rennet to cause clotting, and c) separating whey from the coagulate, and d) processing the coagulate into cheese. The transglutaminase mainatins the proteins within the cheese material during conventional cheese-making processes. The transglutaminase may be deactivated at a desired stage of the process by heat or other controls.

U.S. Pat. No. 5,686,124 describes a method for restructuration of raw meat for production of restructured raw meat by addition to the meat of transglutaminase The method for restructuration of raw meat for production of restructured raw meat by addition to the meat of transglutaminase comprises the further addition of phosphate (optional) and sodium chloride, with a subsequent temperature treatment. The cohesion and hardness of the restructured raw meat is improved, and it can be sold as a refrigerated meat product. EP 0201975 describes a method of the same general kind as the method of U.S. Pat. No. 5,686,124. However, in relation this prior art method a binding material of external fibrin must be used, which necessitates the use of fibrinogen and expensive thrombin. A preferred embodiment of U.S. Pat. No. 5,686,124, is characterized by the fact that the phosphate (if added), the transglutaminase, and the sodium chloride is added as an aqueous solution. This solution should preferably be as concentrated as possible. In this manner the subsequent mixing process for the raw meat components may be carried out without any difficulty.

U.S. Pat. No. 4,917,904 describes that the properties of meat can be modified by addition of transglutaminase, salt and a phosphate. This prior art, however, does not describe the use of an alkali metal phosphate, and furthermore, this prior art method is not a method for production of restructured raw meat, but a method for production of high temperature treated, smoked meat.

U.S. Pat. No. 5,518,742 describes the use of enzyme preparation for producing bound-formed food. An enzyme preparation for bound-formed food use which comprises transglutaminase, a casein and an edible surface active agent. The enzyme preparation strongly binds raw food materials, and the resulting bound-formed foods have an excellent taste and savor. The enzyme preparation for binding of raw food materials, comprises:

20–99% by weight of a protein selected from the group consisting of casein, calcium caseinate, potassium caseinate, sodium caseinate, casein-containing milk powder and mixtures thereof;

0.01–15% by weight of an edible surface active agent selected from the group consisting of a sucrose fatty acid ester and a sorbitan fatty acid ester; and 1–50,000 units of transglutaminase per gram of said protein in said preparation. It is generally known that, when a bound beef is prepared, binding of meat pieces to one another cannot be effected without the use of a binding agent. The reference has prepared prototype bound beef samples A, B and C by mixing such meat pieces with (A) 1% sodium caseinate only, (B) only transglutaminase in an amount of 1 unit per 1 g meat or (C) 1% sodium caseinate and transglutaminase in an amount of 1 unit per 1 g meat and then allowing each of the resulting mixtures to stand still at ordinary temperature for 30 minutes. Tensile strength (g/cm.sup.2) of each of the thus prepared prototype samples was measured using a rheometer manufactured by Fudo Kogyo Co., Ltd. Tensile strengths (g/cm2) of the three prototype samples were found to be A=25, B=41 and C=185, thus showing a pronounced synergistic effect caused by the combined use of transglutaminase and a casein. In general, binding of raw materials or cooking and processing performance of the bound product cannot be regarded as effective or acceptable when the tensile strength is less than 100 g/cm$^2$. The enzyme preparation of this reference may further contain various optional ingredients, in addition to the essential active ingredients transglutaminase and caseins. One of such optional ingredients is a food filler. Any of common food fillers can be used without particular limitation, which include for example lactose, sucrose, maltitol, mannitol, sorbitol, dextrin, branched dextrin, cyclodextrin, glucose, starches such as potato starch, polysaccharides, gums, emulsifiers, pectin, oils and fats and the like. Of these, starches such as potato starch and branched dextrin are particularly preferred because they do not exert influence on the binding effect of raw food materials by transglutaminase and casein and they have no taste or odor. These food fillers may be used singly or as a mixture of two or more. Such food fillers are useful for giving characteristic properties to foods, especially those properties required in addition to the binding capacity, such as a juicy feeling, a good throat-passing feeling and a soft eating touch even when the food is cooled. In addition to these food fillers such as branched dextrin and the like, the enzyme preparation of the present invention may also contain proteins other than caseins, as other optional component, which include soybean proteins such as isolated soybean protein, concentrated soybean protein, extracted soybean protein, defatted soybean protein and the like; wheat proteins such as wheat gluten and the like and wheat flour which contains wheat proteins; corn protein; and egg proteins such as albumen, egg albumin and the like. These proteins also impart a binding function. The only actual example of the use of cheese material in the process is Example 29 wherein slices of cheese, meat and cucumber are layer with intermediate layers of the glue bonding the layers together. The transglutaminase bonds the casein in the mixture into essentially a glue that adheres the layers together, forming a definitive seam line and adding distinct contents component into the seam line (e.g., the casein or salt caseinate, and other ingredients within the glue).

U.S. Pat. No. 5,928,690 is directed to a process for improving the quality of pale, soft and exudative meat by treating meat with transglutaminase enzyme. The invention is particularly well suited for manufactured pork and turkey breast products such as canned or packaged hams and turkey breasts. The manufactured meat products have reduced cooking purge, improved binding of the muscle pieces and firmer texture. A process is disclosed for lessening, repairing or reversing the PSE (pale, soft and exudative) characteristics in meat, the process comprising treating a meat source having PSE characteristics with an aqueous solution consisting essentially of a selected quantity of transglutaminase at a temperature and for a time sufficient to lessen, repair or reverse the PSE characteristics of the meat source, the treating being prior to a curing procedure which includes cooking and/or smoking the meat source.

A number of patents or publications teach the use of the enzyme transglutaminase (also referred to hereafter as "TG"), also known as glutamate transaminase, to improve the water retention and texture of fish, fowl and animal meats, particularly ground or minced meats, soybean protein, egg albumin and casein containing products. For example, U.S. Pat. No. 4,917,904 to Wakameda et al. describes a process whereby TG is added to various meats, soybean protein, egg albumin or casein-containing mixtures to improve the texture thereof. Specifically, Wakameda et al. describe adding TG to ground fish meat, minced fish meat, fillet and lyophilized fish powder, ground or minced animal meat, and fowl and block meat to improve the water retention of the final ground or minced meat product. However, Wakameda et al. state that while TG enhances the water retention in such animal meat and fowl, the texture thereof becomes hard to masticate or chew. This difficulty in chewing the product is an undesirable property. Wakameda et al. do not teach the use of TG to lessen, reverse or repair the PSE condition or the effects of the PSE condition.

Examples of publications discussing TG effects include "Transglutaminase Mediated Polymerization of Crude Actomyosin Refined From Mechanically Deboned Poultry Meat", Akamittath and Ball, Journal of Muscle Foods 3, 1992, 1–14; and "Strength of Protein Gels Prepared With Microbial Transglutaminase as Related to Reaction Conditions", Sakamoto, Kumazawa and Motoki, Journal of Food Science, Volume 59, No. 4, 1994.

European published patent application 0 333 528 describes the genetic alteration of micro-organisms to produce TG and the addition of such genetically altered micro-organisms to ground meats to improve the texture of the ground meat when it is cooked. Generally, the genetically altered micro-organisms are described as being used with ground beef, soya, and casein, among other substances, to prepare ground meat products, sausages and cheeses. This publication does not teach the use of the TG-producing micro-organisms to lessen, reverse or repair the PSE condition or the effects of the PSE condition.

A number of approaches have been described in the art to prevent the development of the PSE condition. Exemplary references include U.S. Pat. Nos. 4,190,100 and 4,551,338 to Wallace; Borchet et al., "Prevention of Pale, Soft Exudative Porcine Muscle Through Partial Freezing with Liquid Nitrogen Post-Mortem", J. Food Science 29 (2): 203–209 (1964); and E. J. Briskey, "Etiological Status and Associated Studies of Pale, Soft, Exudative Porcine Musculature", Adv. Food Research, 13: 159–167 (1964). More recently, U.S. Pat. No. 5,085,615 to Gundlach et al. described the use of solid carbon dioxide to reduce the development of PSE characteristics in freshly killed meat. While the above citedart describes various methods of preventing the development of PSE characteristics in meat, none of them describe a procedure for lessening, reversing or repairing the effects of PSE once it has occurred. That is, the art does not describe a process whereby meat cuts or chunks or grinds which have developed or begun to develop PSE characteristics may be treated to lessen, reverse or repair the PSE process or the effects of the PSE process such that the quality of pale, soft and exudative (PSE) meat improves and becomes more nearly like those of normal meat.

Japanese patent publications describing the use of TG are No. 06261692A (preparation of animal feeds by allowing TG to act upon the meat of animals, fish and/or their by-products which are used as such feeds); No. 6225729A (addition of TG to ground fish or cattle meat); No. 6197738A (addition of TG to ground meat for making hamburgers); No. 6113796A (addition of TG to paste food for making sausages or hamburgers of fish meats); No. 6090710A (using thrombin in combination with plasma protein, fibrinogen concentrate, fibrinogen or transglutaminase plasma); No. 5207864A (use of transglutaminase to improve meat color); No. 3210144A (use of transglutaminase with canned, or potted meat, fish, crab and scallop products); No. 2255060A (adding transglutaminase to minced meat or fish paste products); No. 2100655A (addition of transglutaminase to ground fish meat); and No. 2100654A (addition of transglutaminase to ground 'okiama' (Euphausia superba) fish to improve the water retention and smoothness of the finished ground product). Additional Japanese patent publications describing the use of transglutaminase are Nos. 2100653A, 2100651A, 2086748A and 2079956A, all of which describe the use of transglutaminase with ground fish or meat pastes.

BRIEF DESCRIPTION OF THE INVENTION

A process improves the quality of recombined curd, milled cheese curds and/or cheese components by reducing voids and apparent lines of fracture in the recombined cheese, without the necessity of adding such volumes or types of materials into the product as would affect other aspects of quality such as taste. The process comprises combining segments of curds or cheese with a selected quantity of transglutaminase that coats surfaces of curd or cheese segments to be combined. The curds may be milled cheese curds, and may be taken directly off-line in the manufacturing process 9 with or without cooling), and then combined with the transglutaminase, then fed into a form. The segments with the transglutaminase are stored at a temperature (and pressure) and for a time sufficient to fuse, bond, lessen, repair or reverse the apparent lines and voids between interfaces where the segments are in contact with each other, the application of the transglutaminase to at least some cheese segments occurring before sufficient pressure has been applied to segments of cheese to be compacted to eliminate at least 70% of the air by volume between the segments of cheese, at least 80% of the air volume, at least 90% of the air volume, at least 95%, at least 97%, at least 98% or 99%, and approaching 100% of air/gas elimination between sections to be restructured. The process may allow the segments of cheese to react with the transglutaminase for at least 5 minutes in a temperature range of between 32 to 125° F. It is preferred to allow the reaction to occur undisturbed for at least two hours, at least 4 hours, and up to weeks and months before grading. It should be apparent to those skilled in the art that the transglutaminase remains in the presence of the cheese, is never removed, and the reaction binding the proteins in the cheese by the transglutaminase will continue to effective completion. The transglutaminase has been found to be useful in various forms, including, but not limited to solid and liquid application media. As a solid, the transglutaminase may be provided in any active form (e.g., solid compound, salt, complex, encapsulate, mixture or blend and may be used in a pure or diluted state. Because of the activity level of the transglutaminase, it is preferred to provide the active ingredient in a diluted form. In a solid format, the transglutamines in an active form may be diluted with any biotolerable solid (e.g., non-toxic filler), particularly those with no taste or flavor, or those with desired taste and flavor. Among the types of fillers that would be tolerable or desirable would be salts (e.g., common NaCl), carbonates (e.g., $CaCO_3$, $MgCO_3$, etc.), inorganic oxides (e.g., silica), microcellulose fibers, pulp fiber, etc. Certain fillers would be useful and satisfactory from a functional or taste standpoint, but might not be acceptable under USDA standards, or might require additional labeling or the like. In a solid form, the transglutaminase may be present as from 0.001 to 100% by weight of the solid, more likely in an amount of from 0.05 to 50% by weight of solid in the applied transglutaminase composition, or from 0.1 to 30% by weight solid, or from 2 to 25% by weight solid. The solid must be added so that an effective amount of the transglutaminase is added to assist in and effect the joining of the curd or cheese units, which will be in part dependent upon the surface area of the curd or cheese that is available for, and needed for joining and bonding. As the size of the cheese segments diminishes, the surface area/weight increases, but because the pieces are smaller, less surface area might have to be bonded to assure a firm product. In general, the active ingredient (transglutaminase) may be present as from 0.0001% to 2% by weight of curd and cheese weight, from 0.0001% to 1.0%, from 0.0001% to 0.5%, and 0.005 to 0.1% by weight of curd or cheese solid weight.

The transglutaminase might also be used, for example, in a solution, as in an aqueous solution, in which the transglutaminase might be present in the solution range of about 0.00001–0.05 parts per weight (or as 10 to 100,000 units of transglutaminase per liter) of transglutaminase per gram of cheese product. The volume and/or amount of transglutaminase used per weight of cheese depends, in part, upon the surface area available from the materials to be combined (e.g., based upon standard geometric calculations where surface area tends to be inversely proportional to segment size) and in part on the strength of the bond desired and the nature of the cheese itself, with different hardness levels of cheese and lesser flexibility in the cheese components possibly needing greater pressure and higher concentrations of transglutaminase. Even when in a liquid carrier medium, with the transglutaminase as a solute, suspension or dispersion, the transglutamines does not act in the manner of a paste, and should not merely be a physical glue between units or segments of curd or cheese, as in U.S. Pat. No. 5,518,742. There, transglutaminase is combined with protein (including caseine and other materials) to react with the protein and some of the other materials to effectively form a paste or glue. This method tends to create lines of demarcation between segments (which may not be as undesirable where, as in the single example of cheese with cucumber and meat, the lines of separation of materials are already clearly identifiable). Some minor amount of protein (e.g., less than 50% total weight of solids, less than 40% total weight of solids, less than 30%, less than 20%, less than 10%, or less than 5% total weight of solids or total weight of solids that may react with the transglutaminase, whether in solid or liquid form).

As is universally known, transglutaminase is an enzyme so-called "amine introducing system" which catalyzes introduction of primary amines, ammonia, hydroxylamine, diamino acids, monoamino acids, esters and the like into receptor proteins and peptides such as casein, beta.-lactoglobulin, insulin and the like. In a system in which a protein to be used in the present invention is contained, it is known that this enzyme catalyzes a crosslink formation reaction in which the epsilon.-amino groups of the lysine residues in the protein replace the glutamine amino groups (cf. Japanese Patent Publication (Kokoku) No. Hei 1-50382 and Japanese Patent Application Laying-Open (Kokai) No. Hei 1-27471, corresponding to U.S. Pat. No. 5,156,956).

It is known that transglutaminase is found with high activity in the liver of mammals such as guinea pigs and the like, as well as in several types of microorganisms, plants and fishes. Transglutaminase to be used in the present invention is not particularly limited in its origin. That is, its origin is not restricted provided that the enzyme has a transglutaminase activity. Examples of useful transglutaminase include those originating from the guinea pig liver (Japanese Patent Publication (Kokoku) No. Hei 1-50382), from plants, from fishes (for example, those reported by N. Seki et al. in Abstract of Papers, 1988 Autumn Meeting of the Japanese Society of Scientific Fisheries, page 167, and in Abstract of Papers, 1990 Spring Meeting of the Japanese Society of Scientific Fisheries, page 219), and from microorganisms (Japanese Patent Application Laying-Open (Kokai) No. Hei 1-27471, op. cit.), as well as those prepared by means of recombinant DNA techniques (Japanese Patent Application Laying-Open (Kokai) No. Hei 1-300889).

Transglutaminase can be classified into calcium-independent and calcium-dependent types. Examples of the former type include the aforementioned ones of microbial origin. Examples of the latter type include the aforementioned ones of guinea pig liver origin and of fish origin. Though both types of transglutaminase can be used, the calcium-independent type is preferable from the viewpoint of application to a wide range of foods. Transglutaminase originating from a microorganism belonging to the genus Streptoverticillium is particularly preferred, because it is calcium-independent and can be obtained easily at a low cost (Japanese Patent Application Laying-Open (Kokai) No. Hei 1-27471).

Though not particularly limited, an enzyme preparation of the present invention may generally contain transglutaminase in an amount of from 0.1 or from 1 to 50,000 units, preferably from 1 to 5,000 units of transglutaminase per 10 $cm^2$ of curd or cheese surface area in the masses of curd or cheese to be combined. The transglutaminase should be applied in concentrations (e.g., essentially neat (pure component) or high concentrations greater than 1%, 5%, 10% by weight, greater than 20%, greater than 40%, greater than 50%, greater than 75%, greater than 80% by weight as compared to the total weight of the solids or solutions/mixture applied) that can assure even and sufficient distribution over the cheese segment surface. The transglutaminase may be spread over the surface of the curd in a number of different manners, as by mixing, tumbling, spraying, shaking, stirring, agitating, or any other physical method or associating the transglutaminase with the curd or cheese solid. As a matter of course, it is preferable to use highly purified transglutaminase in the present invention, whether in solid mixture or with a liquid carrier.

The process of the present invention generally comprises providing pieces, segments, or other partial sizes of curd or cheese (cured cheese) that are intended to be packaged into a larger size of curd or cheese material, combining the curds or cheese parts with sufficient transglutaminase as to provide a binding (crosslinking, coupling intermolecular chemical bonding) effective amount of transglutaminase per unit area of curd or cheese, then shaping the curd or cheese with sufficient reduction of air pressure (e.g., vacuum drawdown) pressure to compact the curds or cheese and remove gas (e.g., at least 90%, at least 95%, and near 100% removal of air from between surfaces being brought together for bonding). The gas (usually air) is removed from between adjacent surfaces when they are being joined. The level of pressure tends to be significantly lower than the traditional pressing (high pressure, shape compacting) used in cheese molding or pressing whey out of the intermediate cheese processing. The pressure for example my be on the order of 1–15 pounds per square inch, or 1–10 pounds per square inch, or the like. Reduced air pressure or increased vacuum pressure is also a very convenient method for compacting the curds or cheese, alone, or in combination with physical pressure, as with draw-down and shrink wrap. The level of pressure used may be with a pressure reduction to 0.8 Torr (0.8 atmospheres), 0.7 Torr (0.7 Atm.), 0.6 Torr (0.6 atm.), 0.5 Torr (0.5 atm.), 0.4 or 0.3 Torr (0.4 or 0.3 Atm.) and the like or less.

The enzyme preparation of the present invention is used for example by directly applying it to the curds pieces, milled curd pieces, cheese pieces, and the like to be treated or by dissolving or suspending it in water and then mixing the resultant solution or suspension with the raw material. Especially, if the enzyme preparation is used by dissolving, dispersing or suspending it in water and then mixing the resulting solution or suspension with the curd pieces or cheese pieces, partial inactivation of the transglutaminase may occur due to its denaturation when the pH value of the solution or suspension is outside the stable pH range of transglutaminase or when the ionic strength of the solution or suspension is outside the stable ionic strength range of the enzyme.

As for the former case, denaturation of transglutaminase can be prevented by incorporating into the enzyme preparation of the present invention a pH adjusting agent such as sodium hydrogencarbonate, sodium citrate, sodium phosphate or the like in such an amount that the final pH of the enzyme preparation when dissolved or suspended in water is adjusted to within the stable pH range of transglutaminase. As for the latter case, denaturation of transglutaminase can be prevented by incorporating into the enzyme preparation of the present invention an electrolyte such as sodium chloride, potassium chloride or the like in such an amount that the final ionic strength of the enzyme preparation when dissolved or suspended in water is adjusted to within the stable ionic strength range of transglutaminase. It is especially preferable to incorporating an electrolyte such as sodium chloride, potassium chloride or the like in advance into the enzyme preparation from the viewpoint of preventing denaturation of transglutaminase. If desired, the enzyme preparation of the present invention, whether in solid or liquid form, may further contain appropriately seasonings, sugar, coloring agents, color fixing agents, ascorbic acid or salts thereof, emulsifiers, oils and fats and the like, as well as enzyme stabilizers such as calcium chloride, sodium sulfite, sodium bicarbonate and the like (Japanese Patent Application Laying-Open (Kokai) No. Hei 4-207194). The amount of any of these ingredients should not be sufficient to adversely alter the appearance, flavor, texture or other characteristics of the curds or cheese.

DETAILED DESCRIPTION OF THE INVENTION

The present invention describes a process for forming relatively smaller pieces or segments of cheese into relatively larger sizes of cheese by constructing or reconstructing or structuring a relatively large volume of cheese. The smaller pieces of cheese are associated with a solution containing a transaminase enzyme to form a pre-block of unbonded cheese segments and transglutaminase. That pre-block is then formed into a block or form of a marketable volume of cheese. The resulting block or marketable volume has low air content (e.g., less than 5% total volume of air), with very few visible join lines, with stable binding between joined surfaces, and other stable physical characteristics in the resulting block or marketable volume. The process is particularly beneficial in utilization with the newer processes of the art, particularly where taking intermediate size blocks of curds or cheese (e.g., at least 5 pounds (11.1 kg), at least 10 pounds (22 kg), at least 20 pounds (44 kg), at least 30 pounds (66 kg), or at least 40 pounds (88 kg) of curds or cheese.

The invention may be described according to the following variations as a process for the structuring of a cheese portion comprising: providing portions of curd or cheese of a first average dimension and having a total surface area; adding a composition comprising transglutaminase to at least five percent of said total surface area, said composition providing a bonding-sufficient amount of transglutaminase to said total surface area; pressing said portions together to eliminate air between said portions while forming a volume of curds or cheese that is larger than an single portion of said portions of curds or cheese; and allowing said transglutaminase to bond said portions of curds or cheese together to form a unit of cheese. The composition may comprise transglutaminase in the presence of less than a 1:1 weight ratio of casein or caseinate to transglutaminase, as the transglutaminase itself chemically bonds the proteins between curd or chese segments and does not require additional material to be present to form a paste. For example, the composition may comprise transglutaminase with less than 10% by weight of said transglutaminase composition comprising casein or caseinate. The transglutaminase may be provided to the curds or cheese in an amount of about 0.01–10.0 units per gram of curd protein or cheese protein. The process, as noted above in greater detail, may operate in a time frame in which said curds or cheese are allowed to bond is in the range of about 10–80 hours at a temperature is between 40° F. and 125° F. It is convenient to have the transglutaminase provided as a solid mixture of transglutaminase and inorganic filler at a concentration in the range of about 0.02–5 units of transglutaminase per gram of curds or cheese protein.

Another way of generally describing a process of the invention for the structuring of a cheese portion comprises breaking a single curd portion having a weight of between 2 and 40 kilograms into smaller segments of curd; adding a composition comprising transglutaminase to the smaller segments of curd in an amount of transglutaminase sufficient to chemically bond the smaller segments of curd together; pressing the segments of curd together to compact and/or shape (e.g., with elimination of air between the portions) the curds while forming a volume of curds that is larger than 50 kilograms; and allowing said transglutaminase to bond said segments of curds together. The process may allow the transglutaminase to bond segments of curds together during a storage (curing, aging, reaction, or holding process step) for at least two hours (up to weeks and months) at a temperature between 40° F. and 125° F. The process causes segments of curd cure to form cheese during said transglutaminase to bond said segments of curds together during the storage step, the step enabling the formation of chemical bonds between smaller portions of curd linked by the transglutaminase. The process may have the transglutaminase added as a solid composition to said smaller segments of curds, although a liquid carrier may be used. The solid composition of transglutaminase may comprise a mixture of transglutaminase and inorganic solid. The transglutaminase may be added to said smaller segments of curd in an amount of 0.001 to 0.5% by weight of transglutaminase to said smaller curd segments, as noted above. The process may have the transglutaminase added to the smaller curd segments by a physical process including at least one step selected from the group consisting of tumbling, stirring, agitation, spraying, stirring, and shaking. The process may use, for example, a composition comprising transglutaminase with from 0–10% by weight of transglutaminase of protein. Where the composition comprising transglutaminase comprises transglutaminase in an aqueous carrier, the composition may be free of ingredients that will chemically bond with said transglutaminase, or have less than an amount that would bond with 50%, or have less than an amount that would bond with 20% of available bonding sites on the transglutaminase. The process allows the smaller segments of curd to be chemically bonded by said transglutaminase reacting solely with protein in said smaller curd segments, rather than with a material added in the transglutaminase composition to form a paste or glue.

The enzyme transglutaminase (glutamate transaminase; R-glutaminyl peptide amine gamma-glutamyl transferase; protein-glutamine, amine-gamma-glutamyltransferase) or TG is a $Ca^2$ dependent enzyme which catalyzes crosslinking reactions in meat and plant proteins. These reactions lead to the formation of intra- and inter-molecular covalent bonds which are significantly stronger than normal hydrogen bonding between proteins. The protein crosslinking process which occurs with the use of TG results in bonding the smaller segments of cheese without cooking or high pressure, thus restoring normal functionality and appearance and USDA gradability to cheese parts, segments, trim or waste. This process thereby improves the characteristics and therefore the value of the substantial volume of waste, trim, parts or segments of cheese that is produces in conventional cheese manufacture.

Although it is preferable that the transglutaminase (TG) used in practicing the invention be a highly purified product, crude products such as those obtained from bovine, equine and swine plasma or liver extracts may also be used. Those obtainable as bacterial preparations or fermentations may be used as well. The transglutaminase used in the examples given herein could be obtained from Sigma Chemical Company, St. Louis, Mo. (catalogue number T5398; Enzyme Commission (EC Number EC 2.3.2.13, guinea pig liver). The enzyme could be purchased as vials containing 0.5 unit TG per vial. The TG containing solutions used herein could be prepared by combining 21 ml distilled water with the contents of each vial to give a transglutaminase solution containing 0.0238 units of TG per ml of solution.

The amount of transglutaminase used in practicing the invention may range between an effective amount and an amount that is economically justified, with increasing amounts tending to decrease the treatment time in a substantially linear manner. Typical concentrations of transglutaminase can range from at least about 0.001 or 0.005 unit/g of curd or cheese protein being processed to about 10–50 units/g of curd or cheese protein. A typical range of transglutaminase is between about 0.02 and about 5 units/g of curd or cheese protein. When costs are not prohibitive, an advantageous amount is between about 1 and about 5 units/g of cheese protein. The time for which the meat is cured or incubated in a TG containing solution may range from about 160 hours to about 5 minutes. The exact time will be dependent of the amount or concentration of transglutaminase in the added solid material or added processing solution, the temperature of the cheese mass and the total surface area of cheese along which bonding is to be effected. Generally, when the transglutaminase is present in an amount of about 0.02 unit/g cheese (or curd) protein being processed, a curing or incubating time of about 24–48 hours is used in practicing the invention. The curing or incubating temperature may be in the range of about 32–125° F. A temperature of about 38–110° F. or 60–110, or 70–100 is especially useful. Transglutaminase treatments can incorporate known procedures for facilitating physical distribution of the transglutaminase to the surface of the curds or cheese parts, as by spraying, tumbling, dusting, mixing, agitating, or the like.

What is claimed:

1. A process for the structuring of a cheese portion comprising:
   providing portions of curd or cheese in segments of a first average dimension and having a total surface area,
   adding to said segments a composition comprising transglutaminase to at least five percent of said total surface area of said segments, said composition providing a bonding-sufficient amount of transglutaminase to said total surface area,
   pressing said portions together, while the bonding-sufficient amount of transglutaminase to said total surface area of the curd or cheese segments is present on the surface of the curd or cheese segments, to eliminate air between said portions while forming a volume of curds or cheese that is larger than a single portion of said portions of curds or cheese,
   allowing said transglutaminase to bond said portions of curds or cheese together to form a unit of cheese.

2. The process of claim 1 wherein said composition comprises transglutaminase in the presence of less than a 1:1 weight ratio of casein or caseinate to transglutaminase.

3. The process of claim 1 wherein said composition comprises transglutaminase with less than 10% by weight of said tranaglutaminase composition with respect to cheese protein.

4. The process according to claim 1 wherein said transglutaminase is provided to the curds or cheese in an amount of about 0.01–10.0 units per gram of cheese protein.

5. The process of claim 4 wherein the time in which said curds or cheese is allowed to bond is in the range of about 10–80 hours at a temperature is between 40° F. and 125° F.

6. The process according to claim 2 wherein said tranaglutaminase is provided as a solid mixture of transglutaminase and inorganic filler at a concentration in the range of about 0.02–5 units of transglutaminase per gram of curds or cheese protein.

7. A process for the structuring of a cheese portion comprising:
   breaking a single curd portion having a weight of between 2 and 40 kilograms into smaller segments of curd;
   adding a composition comprising transglutaminase to said smaller segments of curd in an amount of transglutaminase sufficient to chemically bond said smaller segments of curd together,
   pressing said segments of curd together, while the amount of transglutaminase to said total surface area of the curd or cheese segments is present on the surface of the curd segments to eliminate air between said segments while forming a volume of curds that is larger than 50 kilograms, and allowing said transglutaminase to bond said segments of curds together.

8. The process of claim 7 wherein said allowing said transglutaminase to bond said segments of curds together is performed for at least two hours at a temperature between 40°F. and 125°F.

9. The process of claim 8 wherein said segments of curd cure to form cheese during said allowing said transglutaminase to bond said segments of curds together.

10. The process of claim 7 wherein said transglutaminase is added as a solid composition to said smaller segments of curds.

11. The process of claim 10 wherein said solid composition of transglutaminase comprises as a mixture of transglutaminase and inorganic solid.

12. The process of claim 7 wherein transglutaminase is added to said smaller segments of curd in an amount of 0.001 to 0.5% by weight of transglutaminase to said smaller curd segments.

13. The process of claim 12 wherein said transglutaminase is added to said smaller curd segments by a physical process including at least one step selected from the group consisting of tumbling, stirring, agitation, spraying, stirring, and shaking.

14. The process of claim 7 wherein said composition comprising transglutaminase comprises transglutaminase in an aqueous carrier, and the composition is free of ingredients that will chemically bond with said transglutaminase.

15. The process of claim 12 wherein said smaller segments of curd are chemically bonded by said transglutaminase reacting solely with protein in said smaller curd segments.

16. A process for the structuring of a cheese portion comprising the following steps in sequence:
   a) providing portions of curd or cheese in segments of a first average dimension and having a total surface area,
   b) adding a composition comprising transglutaminase to at least five percent of said total surface area of the curd or cheese segments, said composition providing a bonding-sufficient amount of transglutaminase to said total surface area of the curd or cheese segments,
   c) pressing said portions together to eliminate air between said portions while 1) a bonding-sufficient amount of transglutaminase to said total surface area of the curd or cheese segments is present on the surface of the curd or cheese segments, and 2) forming a volume of curds or cheese that is larger than a single portion of said portions of curds or cheese, and
   d) allowing said transglutaminase to bond said portions of curds or cheese together to form a unit of cheese while the bonding-sufficient amount of transglutaminase to said total surface area of the curd or cheese segments is present on the surface of the curd or cheese segments.

17. The process of claim 16 wherein said allowing said transglutaminase to bond said segments of curds together is performed for at least two hours at a temperature between 40° F. and 125° F.

* * * * *